United States Patent
Aiken et al.

(10) Patent No.: US 6,520,678 B2
(45) Date of Patent: Feb. 18, 2003

(54) VEHICLE CENTER BEARING ASSEMBLY INCLUDING PIEZO-BASED DEVICE FOR VIBRATION DAMPING

(75) Inventors: Albert Aiken, Toledo, OH (US); James A. Duggan, Temperance, MI (US)

(73) Assignee: Spicer Driveshaft, Inc., Holland, OH (US)

(*) Notice: Subject to any disclaimer, the term of this patent is extended or adjusted under 35 U.S.C. 154(b) by 98 days.

(21) Appl. No.: 09/818,216

(22) Filed: Mar. 27, 2001

(65) Prior Publication Data

US 2002/0139603 A1 Oct. 3, 2002

(51) Int. Cl.[7] .............................. F16C 27/00; B06B 1/06
(52) U.S. Cl. .............................. 384/1; 310/319; 384/536
(58) Field of Search .............................. 384/1, 536, 582; 180/377, 379, 380, 381; 404/180; 310/339, 319, 316.01, 348, 340, 368

(56) References Cited

U.S. PATENT DOCUMENTS

| | | | |
|---|---|---|---|
| 4,966,251 A | 10/1990 | Hirano | 180/338 |
| 5,221,146 A | 6/1993 | Maruyama | 384/447 |
| 5,251,264 A | 10/1993 | Tichy | 381/173 |
| 5,315,203 A | 5/1994 | Bicos | 310/326 |
| 5,334,096 A | 8/1994 | Iwao | 464/146 |
| 5,397,183 A * | 3/1995 | Lu et al. | 384/1 |
| 5,553,501 A | 9/1996 | Gaddis et al. | 73/662 |
| 5,636,287 A | 6/1997 | Kubli et al. | 381/71 |
| 5,638,454 A | 6/1997 | Jones et al. | 381/71 |
| 5,730,531 A | 3/1998 | Pinkos et al. | 384/99 |
| 6,012,333 A | 1/2000 | Urushiyama et al. | 73/579 |
| 6,283,637 B1 * | 9/2001 | Schnur et al. | 384/1 |
| 6,420,819 B1 * | 7/2002 | Lazarus et al. | 310/330 |

FOREIGN PATENT DOCUMENTS

EP    0964182    6/1999

OTHER PUBLICATIONS

"Piezos Tame Tough Vibrations", Machine Design magazine, Feb. 19, 1998.

* cited by examiner

*Primary Examiner*—Thomas R. Hannon
(74) *Attorney, Agent, or Firm*—MacMillan, Sobanski & Todd, LLC

(57) ABSTRACT

One or more piezo-based devices are mounted on a center bearing assembly of a drive train assembly for reducing the amount of vibrations that are generated therein during operation. The piezo-based device is used to dampen these vibrations by converting the physical vibratory motion of the driveshaft tube into an electrical current that is dissipated through a resistive element as heat. By varying the magnitude of the resistive element, the center damping frequency of the piezo-based device can be varied as needed for center bearing assembly and drive train. If desired, an inductive element may be provided with the resistive element to dissipate the electrical current. The magnitude of the resistive element may be varied by a controller in response to the magnitude and/or frequency of the vibrations sensed by a sensor. Alternatively, the stiffness of the piezo-based device may be controlled by an electrical current generator that can be operated by a controller in response to the magnitude and/or frequency of the vibrations sensed by a sensor.

20 Claims, 5 Drawing Sheets

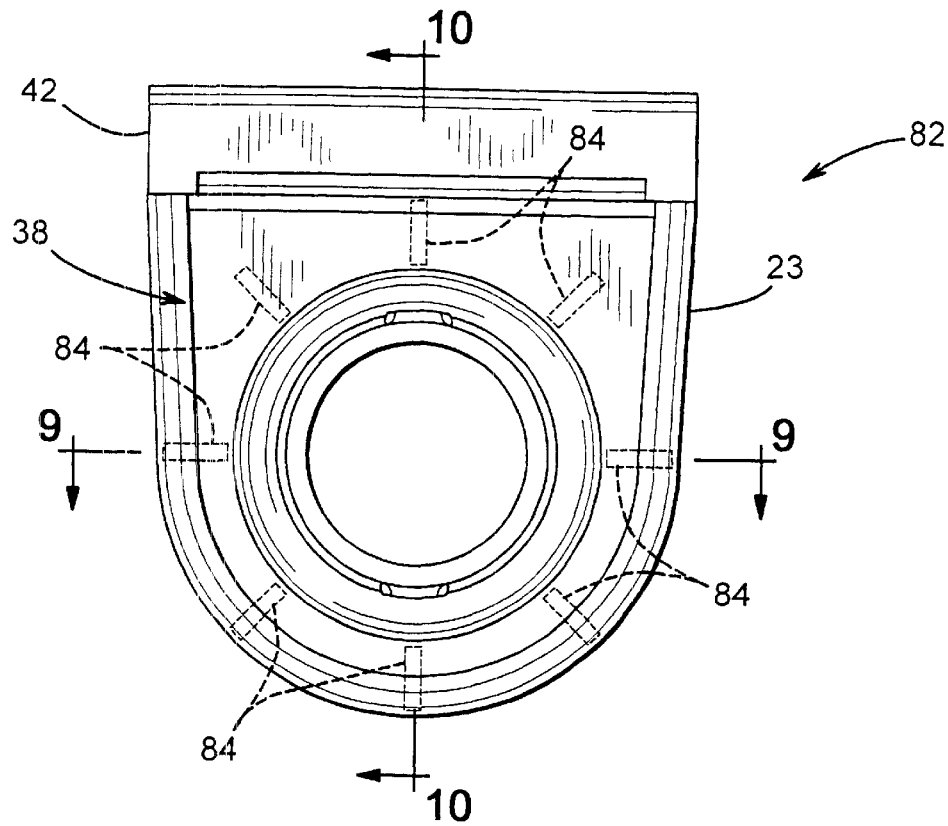
FIG. 8
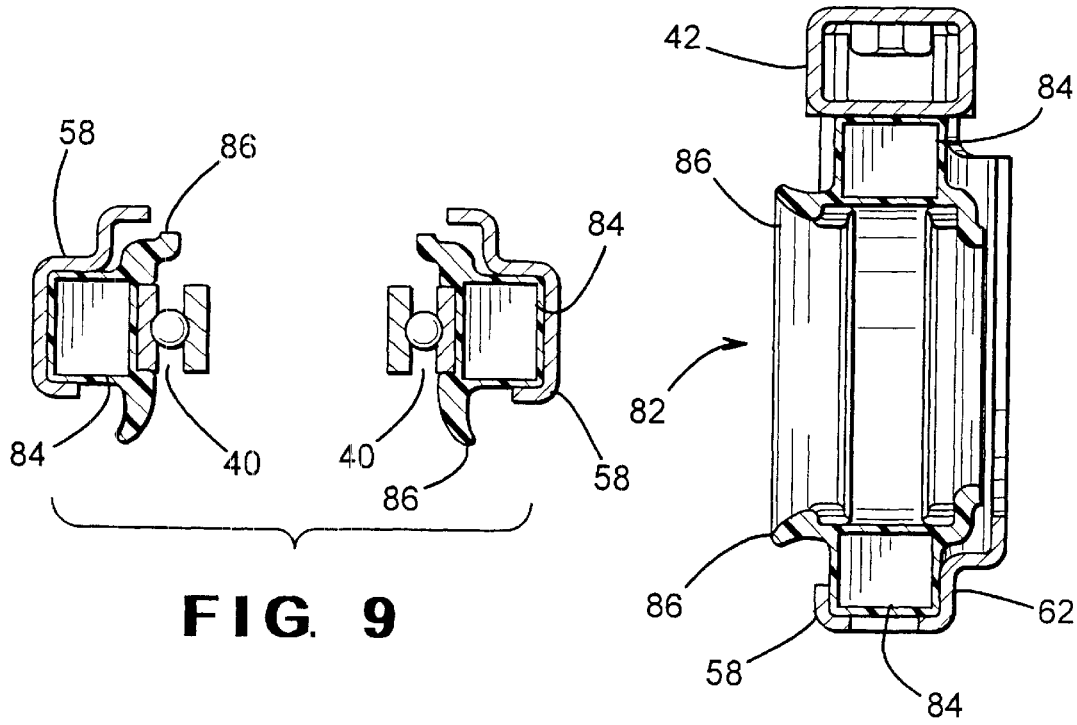
FIG. 9
FIG. 10

VEHICLE CENTER BEARING ASSEMBLY INCLUDING PIEZO-BASED DEVICE FOR VIBRATION DAMPING

BACKGROUND OF THE INVENTION

The invention relates in general to bearings for supporting shafts for rotation and in particular to an improved structure for a center bearing assembly for rotatably supporting an intermediate portion of a vehicle drive train or coupling shaft assembly. More particularly, this invention relates in general to structures for damping vibrations in center bearing assemblies used in vehicle drive train assemblies.

In most rear wheel drive vehicles, a source of rotational energy, such as an internal combustion or diesel engine, is located near the front of the vehicle. The engine is connected by means of a drive train to rotate one or more driven wheels located near the rear of the vehicle. The drive train typically extends between a transmission, which is connected to the engine, and a differential, which is connected to the driven wheels. In some vehicles, the distance separating the transmission and the differential is relatively short. In these vehicles, the drive train includes a single drive tube, usually referred to as the drive shaft. In other vehicles, the distance separating the transmission and the differential is relatively long, making the use of a single drive shaft impractical. In these vehicles, the drive train includes a drive shaft and one or more coupling shafts. The coupling shafts are connected to the drive shaft (and to each other) by universal joints.

Drive trains that are composed of a drive shaft and one or more coupling shafts require the use of one or more intermediate resilient support structures, which are generally referred to as center bearing assemblies or shaft support bearing assemblies. A typical center bearing assembly includes an annular roller bearing within which the coupling shaft is rotatably supported. The roller bearing itself is disposed within a generally annular resilient support member. The resilient support member is, in turn, disposed within a relatively rigid, generally U-shaped bracket which is secured to a cross member extending between the side rails of the vehicle frame.

The resilient support member is provided to reduce vibrations of the drive train in the vicinity of the center bearing assembly and to prevent such vibrations from being transmitted to the vehicle frame. The resilient support member is typically formed from an elastomeric material, such as rubber. Under most vehicle operating conditions, known rubber support members are effective in substantially reducing the transmission of vibrations from the drive train to the vehicle frame. However, the vibration damping characteristics of such known support members, which depend upon the specific material and the particular configuration thereof, remain constant regardless of the vehicle operating conditions. Accordingly, the vibration damping characteristics of known support members can be optimized only for a single set of operating conditions. The vibrations generated by the drive train, on the other hand, constantly change with changes in the operating conditions of the vehicle. As a result, these support members may not provide optimum vibration damping of vibrations under varying operating conditions.

An additional problem associated with the vibration of center bearing assemblies, is that an undesirable audible noise is generated and subsequently transmitted to the driver of the vehicle and to the environment surrounding the vehicle. It is known that all mechanical bodies have a natural resonant frequency at which they tend to vibrate when operated at certain rotational speeds. This natural resonant frequency is an inherent characteristic of the mechanical body and is based upon many factors, including its composition, size, and shape. In the context of vehicular drive train assemblies, the engine and transmission assembly can sometimes generate vibrations that are transmitted to and accentuated by the drive train components when rotated. Also, the drive train components may be rotated at a velocity that is at or near their natural resonant frequency (or one or more of the harmonics thereof), causing vibrations to be induced therein. In either event, the vibrations generated in the drive train components may cause the generation of audible noise. Such noise is usually considered to be undesirable for obvious reasons.

Various attempts have been made to reduce the noise generated by vehicle drive trains during operation. Past attempts have been primarily focused on noise reduction for driveshaft tubes. Known noise reduction structures have been manufactured from many materials, including cardboard, foam, and the like. However, although known noise reduction structures are relatively simple and inexpensive in structure and installation, they have been found to have a relatively modest effect on the reduction of noise in some vehicle driveshaft tubes. Thus, it would be desirable to provide an improved structure for reducing the amount of vibration and noise that are generated in a vehicle drive train assembly during operation.

It would be beneficial if there could be developed an improved structure for a center bearing assembly which includes a mechanism for controlling the vibration characteristics of the center bearing assemblies. Such a mechanism would serve to dampen the vibration of the center bearing assemblies, and would result in a reduction in the undesirable noise that would be otherwise generated by that vibration.

SUMMARY OF THE INVENTION

This invention relates to an improved structure for reducing the amount of vibration and noise that are generated in a vehicle drive train assembly during operation. In particular, this invention relates to a piezo-based device that is attached or otherwise secured to a center bearing assembly in a vehicle drive train assembly for actively and passively reducing torsional and lateral vibrations that are generated therein during use. The piezo-based device is used to dampen these vibrations by converting the physical vibratory motion of the center bearing assembly into an electrical current that is dissipated through a resistive element as heat. By varying the magnitude of the resistive element, the center damping frequency of the piezo-based device can be varied as needed for the particular center bearing assembly and the drive train assembly as a whole. If desired, an inductive element may be provided in a circuit with the resistive element to dissipate the electrical current. The magnitude of the resistive element may be varied by a controller in response to the magnitude and/or frequency of the vibrations sensed by a sensor. Alternatively, the stiffness of the piezo-based device may be controlled by an electrical current generator that can be operated by a controller in response to the magnitude and/or frequency of the vibrations sensed by a sensor. The piezo-based device may be mounted at various locations on the center bearing assembly. If desired, a plurality of such piezo-based devices may be provided on the center bearing assembly.

Various objects and advantages of this invention will become apparent to those skilled in the art from the follow-

BRIEF DESCRIPTION OF THE DRAWINGS

FIG. 8 is an elevational view of another embodiment of the center bearing assembly of the invention, showing piezo-based devices integrated within the rubber support member.

FIG. 9 is a cross-sectional view of the center bearing assembly of FIG. 8, taken along line 9—9.

FIG. 10 is a cross-sectional view of the center bearing assembly of FIG. 8, taken along line 10—10.

DETAILED DESCRIPTION OF THE PREFERRED EMBODIMENTS

Figure 1:
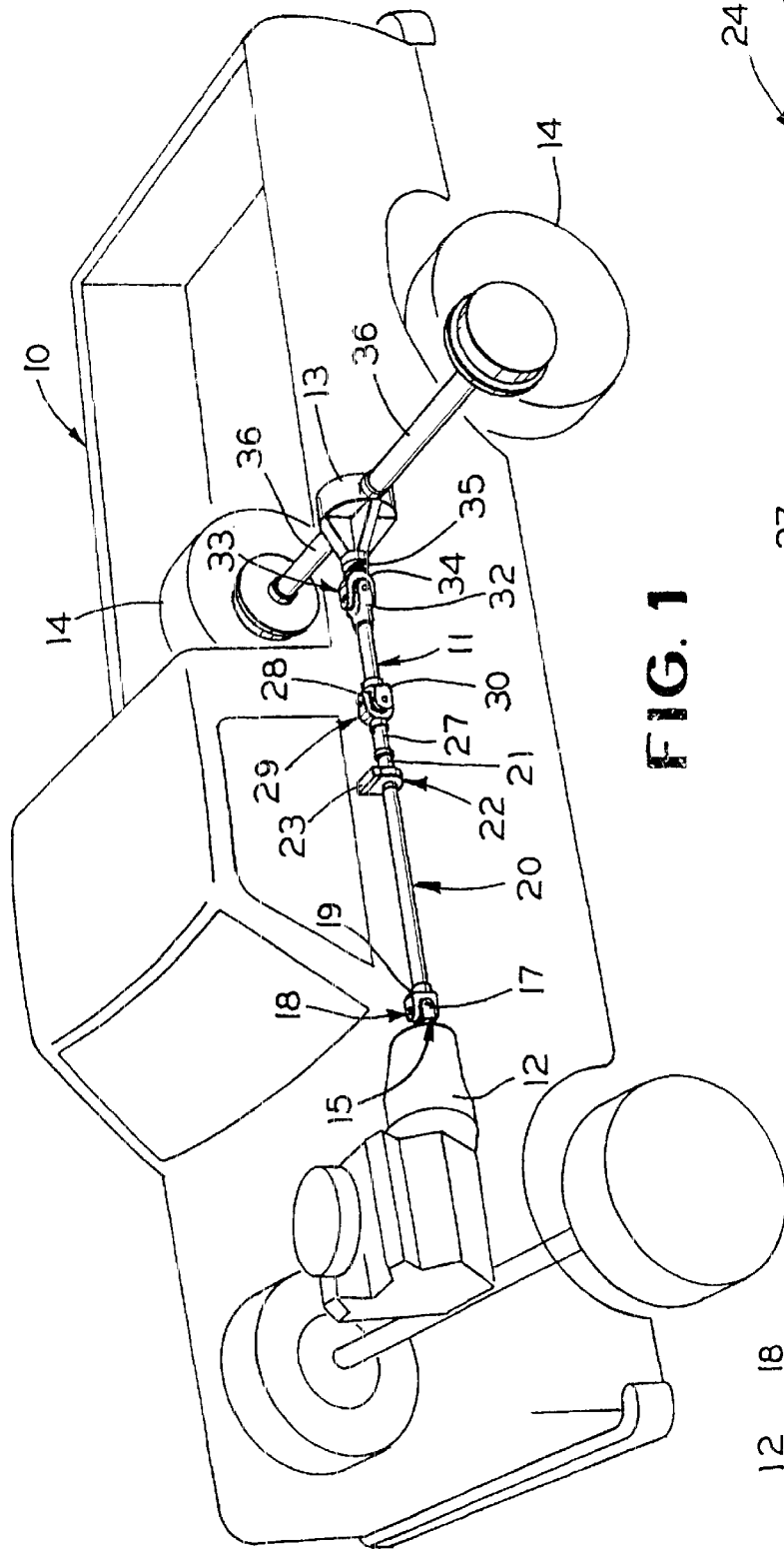
FIG. 1 is a perspective view of a vehicle showing the location of a center bearing assembly of the invention.
Figure 2:
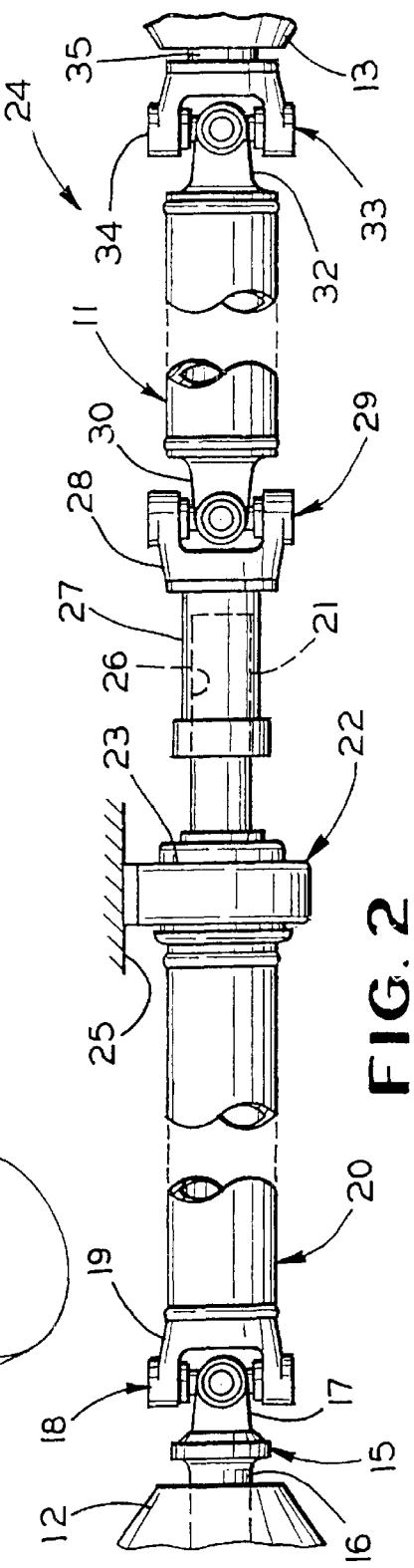
FIG. 2 is a side elevational view of a split driveshaft in a vehicle supported by the center bearing assembly of the invention.

As shown in FIGS. 1 and 2, a vehicle indicated generally at 10 includes a drive train assembly 24. The drive train assembly 24 includes drive shaft components such as a coupling shaft 20 and a drive shaft 11 connected between a transmission 12, and a differential gear 13 for driving a pair of rear wheels 14. The transmission 12 is provided with an output shaft (not shown) of conventional design and having a plurality of splines formed around its periphery and extending in a direction parallel with its axis. A slip yoke 15 has an internally splined tubular end portion 16 which slidably engages the transmission output shaft. The slip yoke 15 also has a yoke end 17 which forms one side of a universal joint 18. The other side of the universal joint 18 is formed by a yoke 19. The coupling shaft 20 has an opposite end terminating in a splined shaft portion 21. A center bearing assembly 22 in accordance with the present invention supports the coupling shaft 20 adjacent the splined shaft portion 21. The center bearing assembly 22 includes a rigid frame or bracket 23 which is rigidly attached to a vehicle frame, chassis or body 25.

The splined shaft portion 21 at the end of the coupling shaft 20 is received by an internally splined end portion 26 of a slip yoke 27 on the drive shaft 11. The splined shaft portion 21 and the splined end portion 26 move in an axial direction with respect to one another while rotating together. The slip yoke 27 has a yoke end 28 which forms a portion of a universal joint 29. A yoke 30 on drive shaft 11 forms a second portion of the universal joint 29. The drive shaft 11 has a second end terminating at a yoke 32 which forms a portion of a universal joint 33. A yoke 34 on a shaft 35 forms a second portion of the universal joint 33. The shaft 35 is connected to the differential gear 13 which is driveably connected through rear axle 36 to the rear wheels 14 of the vehicle 10. All of the above-described drive system apparatus is generally well known to those skilled in the art. U.S. Pat. No. 4,392,694 to Reynolds, owned by the assignee of this invention, discloses the general structure and operation of center bearing assemblies, and the disclosure of Reynolds is incorporated by reference.

Figure 3:
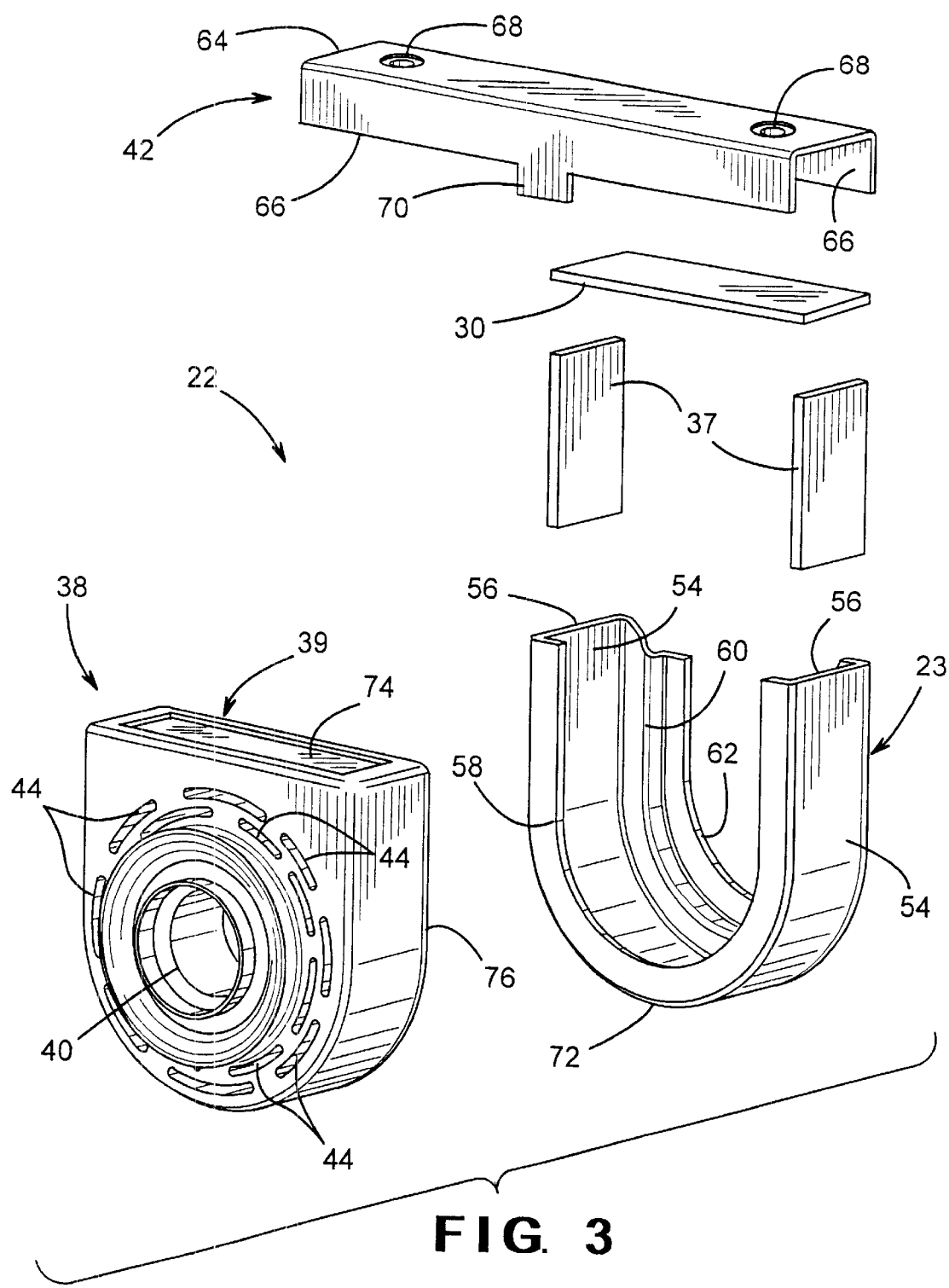
FIG. 3 is an exploded perspective view of the center bearing assembly of the invention.

As shown in FIG. 3, the center bearing assembly 22 is comprised of three major parts, a support member 38 for supporting a ball bearing 40, the bracket 23 for containing the support member, and the mounting channel 42. These parts act together to rotatably support the coupling shaft 20. The support member is a bushing and can be of a semi-rigid rubber material. Preferably, the support member 38 is provided with a series of slots 44 which enable the coupling shaft 20 to have a small degree of relatively free radial movement. Support members of the type used in the invention are generally well known. Typically, such support members are deformable to accommodate movement of the coupling shaft 20. Positioned within the support member is ball bearing 40 which can be any suitable bearing device for supporting the drive shafts of vehicles. The ball bearing can be comprised of inner and outer races, not shown, and balls, also not shown, which can be of conventional design.

The rubber support member 38 is housed within the bracket 23. The bracket has a U-shaped structure with a curved portion 72, and two generally vertical legs 54 terminating at upper ends 56. The bracket also has an inwardly directed lip 58 on the forward side of the bracket, and rearwardly directed lip 60 on the rearward side. It can be seen that the forward and rearward lips define a containment space for the rubber support member 38. A rear flange 62 extends inwardly from the rear lip 60. The rearward spacing of the rear flange from the rearwardly directed lip 60 enables the rubber support member to avoid contact with the rear flange under normal operation of the vehicle.

The mounting channel 42 is adapted to fit together with ends 56 of the bracket. In general the channel has a base 64 and two webs or sidewalls 66. This channel-shaped structure provides the strength needed to securely mount the center bearing assembly to the vehicle frame. The mounting channel is preferably made of steel, although other materials can be used. In order to securely attach the bracket 23 to the mounting channel, the channel sidewalls 66 are preferably welded to the bracket ends 56. Ideally the bracket ends and the mounting channel sidewalls are of roughly the same steel material and of the same thickness to facilitate welding. A preferred method of welding is a metal inert gas weld. Other designs for the bracket, including curved ends, not shown, for attachment to the vehicle frame or body 25 by bolting rather than the straight ends 56 which must be welded, can also be used with the invention.

The channel base 64 is provided with holes 68 through which bolts are passed to secure the center bearing assembly to the vehicle frame. Although two holes are shown, it is to be understood that any number of holes and any number of bolts can be used to secure the center bearing assembly to the vehicle frame. The sidewalls 66 of the mounting channel are provided with vertical encasing sidewall flanges 70 which act to control or limit axial movement of the rubber support member within the bracket. Other members suitable for controlling the axial movement of the rubber support member can be employed.

As is well known, the operation of the engine of the vehicle 10 usually causes a variety of vibrations to occur in various components of the drive train, and in the coupling shaft 20 in particular. Also, the coupling shaft 20 may, in some instances, be rotated at or near its natural resonant frequency, which can cause vibrations to be induced therein. These vibrations can be transmitted to the center bearing assembly 22, including the bracket 23. To reduce or eliminate the generation of undesirable audible noise brought about by this vibration of the center bearing assembly, a piezo-based device, indicated generally at 30, is attached or otherwise mounted on the center bearing assembly 22. The structure and mode of operation of the piezo-based device 30 will be described in detail below. Generally speaking, however, the piezo-based device 30 can be used to dampen these vibrations by converting the physical vibratory motion of the center bearing assembly 22 into an electrical current that is dissipated through a resistive element as heat. By varying the magnitude of the resistive element, the center damping frequency of the piezo-based device 30 can be varied as needed for the particular center bearing assembly and other components of the drive train assembly that are creating the vibration in the first place. Alternatively, as will also be explained in detail below, the piezo-based device 30 can be used as an active actuator, wherein the application of an electrical current to the piezo-based device causes changes in the stiffness or flexibility thereof. This invention contemplates that one or more piezo-based devices 30 be attached to the rubber support member 38 to control torsional and lateral vibrations in the center bearing assembly 22, either passively or actively.

As will be discussed in detail below, the piezo-based device 30 includes one or more elements that are formed from a piezo-electric material. Generally speaking, a piezo-electric material is any material that generates an electrical output when subjected to mechanical stress or deformation, or vice versa. Typically, the piezo-electric material becomes electrically polarized when mechanically strained, such as by the vibrations that are generated in the center bearing assembly 22 during operation. This invention contemplates that any known piezo-electric material may be used in the piezo-based device 30, including piezo-ceramic materials such as lead zirconium titanate.

Figure 4:
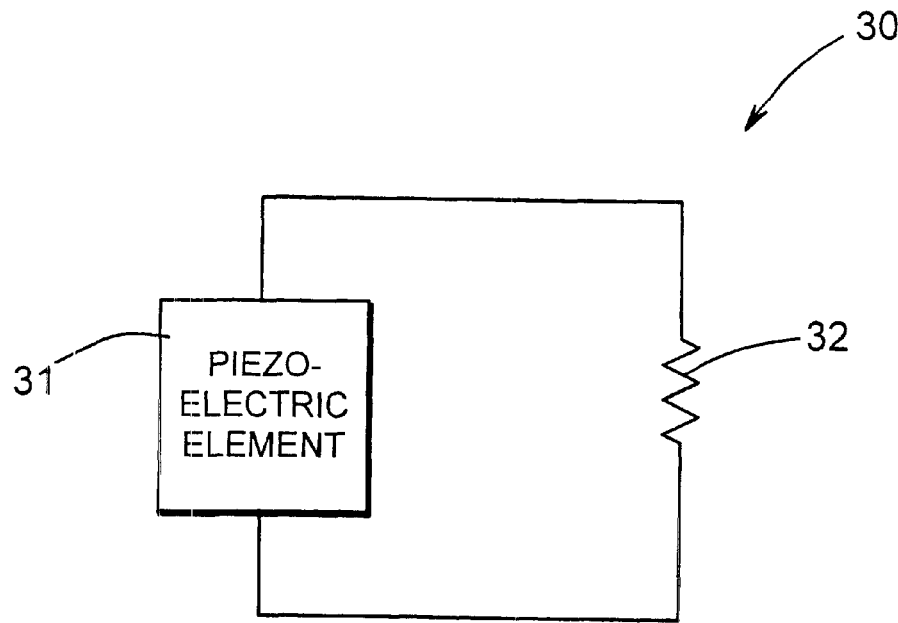
FIG. 4 is a schematic view of a first embodiment of the piezo-based device illustrated in FIG. 1.

FIG. 4 illustrates a first embodiment of the piezo-based device 30. As shown therein, the piezo-based device 30 includes an element 31 formed from a piezo-electric material and a resistor 32 that are connected in a series electrical circuit. In addition to generating an electrical output when subjected to mechanical stress, the element 31 behaves electrically as a capacitor. Thus, the piezo-based device 30 is essentially an RC electrical circuit. When the engine is operated to rotate the drive train components, vibrations are generated in the center bearing assembly 22. These vibrations cause mechanical stresses to be induced in the element 31, causing an electrical output (such as a voltage) to be generated therein. This voltage is converted to an electrical current that is passed through the resistor 32, wherein it is dissipated as heat. As a result, the piezo-based device 30 functions to passively dampen the vibrations that are generated in the center bearing assembly 22.

As is well known, RC electrical circuits have a center damping frequency that is determined by the magnitudes of the resistance and the capacitance therein. It is desirable that this center damping frequency be selected to be close to the frequency of the vibrations in the center bearing assemblies that are desired to be attenuated by the piezo-based device 30. The magnitude of the desired resistance for the resistor 32 can be calculated using the following relationship:

$$R=\{[1-(\lambda k^2)/(1-k^2)]^{1/2}\}/C\omega$$

where R is equal to the resistance of the resistor 32, C is equal to the capacitance of the element 31, k is equal to the transverse coupling constant, $\lambda$ is equal to the strain energy capture, and w is equal to the frequency of the vibrations to be dampened.

As shown in FIG. 3, the piezo-based device 30 can be located or mounted between the mounting channel 42 and a top surface 39 of the rubber support member 38. In one embodiment of the invention, the top surface 39 is provided with an inset area 74 that is of a shape and depth suitable for receiving and retaining the piezo-based device 30. Although the piezo-based device 30 is shown as being mounted between the mounting channel 42 and the top surface 39 of the rubber support member 38, other mounting locations on the center bearing assemblies for the piezo-based device can be used in conjunction with the present invention. For example, one or more piezo-based devices 37, similar to the piezo-based device 30, can be mounted between the sides 76 of the rubber support member 38 and the two generally vertical legs 54 of the bracket 23. The side mounted piezo-based devices 37 can be used singly, in pairs, or in combination with the piezo-based device 30.

In addition to the locations described so far, the piezo-based devices used in the invention can be embedded within the elements of the center bearing assembly 22, such as the rubber support member 38, the bracket 23, or any other element of the center bearing assembly. The most efficient location for the piezo-based device 30 or the side piezo-based devices 37 on the center bearing assembly 22 can be determined on the basis of structural modeling, modal analysis, and actual experimentation. Generally speaking, however, the piezo-based devices 30, 37 will usually be located at the area of greatest strain in order to reduce the greatest amount of vibration.

The piezo-based devices 30, 37 can be attached to the center bearing assembly 22 by adhesives, held in place by the compressive force of the bracket 22 against the rubber support member 38, or secured in any other manner. One of the methods for mounting the piezo-based device to the rubber support member 38 is to mold the piezo-based device into the support member 38 as the support member is formed. Another method for incorporating the piezo-based device into the center bearing assembly 22 is provide the support member 38 in the form of two or more parts, not shown, and assemble the two parts with the piezo-based device sandwiched between the two support member parts. In such a case, the two support parts could also be made so that they could be press fit together, sandwiching the piezo-based device between the two parts.

The invention can also be configured with at least one of the piezo-based devices positioned to span the space between the bearing 40 and the bracket 23. As shown in FIGS. 8–10, the center bearing assembly 82 includes a plurality of piezo-based devices 84 spaced circumferentially around the bearing 40, shown only in FIG. 9. It can be seen that the piezo-based devices 84 extend from the bearing 40 to the bracket 23. Although eight piezo-based devices 84 are shown, any suitable number of piezo-based devices 84, such as four such devices, can be used. In this embodiment, the bracket 23 acts as a ground, and the piezo-based devices 84 are positioned between or linked to both the bracket and the bearing to dampen the vibrational movement of the bearing. For purposes of clarity the bearing 40 is not shown in FIGS. 8 and 10, but when the center bearing assembly 82 is fully assembled, the bearing is held in place by annular flanges 86 of the rubber support member 38. As shown, the piezo-based devices 84 can be formed or integrally molded within the rubber support member.

The physical size of the piezo-based devices 30, 37 can also varied as desired. By incorporating more of the piezoelectrical material into the piezo-based devices 30, 37, more strain energy can be captured and converted to heat. However, the addition of such material increases weight and can have an effect on the operation of the center bearing assembly 22. The amount of the piezo-electric material provided in the element 31 will vary from application to application depending upon a number of factors. The relationship between damping $\zeta$ of the piezo-based devices 30, 37 and strain energy capture $\lambda$ is described by:

$$\zeta = \frac{1}{4}[(\lambda k^2)/(1-k^2)]^{1/2}$$

where $\lambda$ is equal to the strain energy capture and k is equal to the transverse coupling constant.

Figure 5:
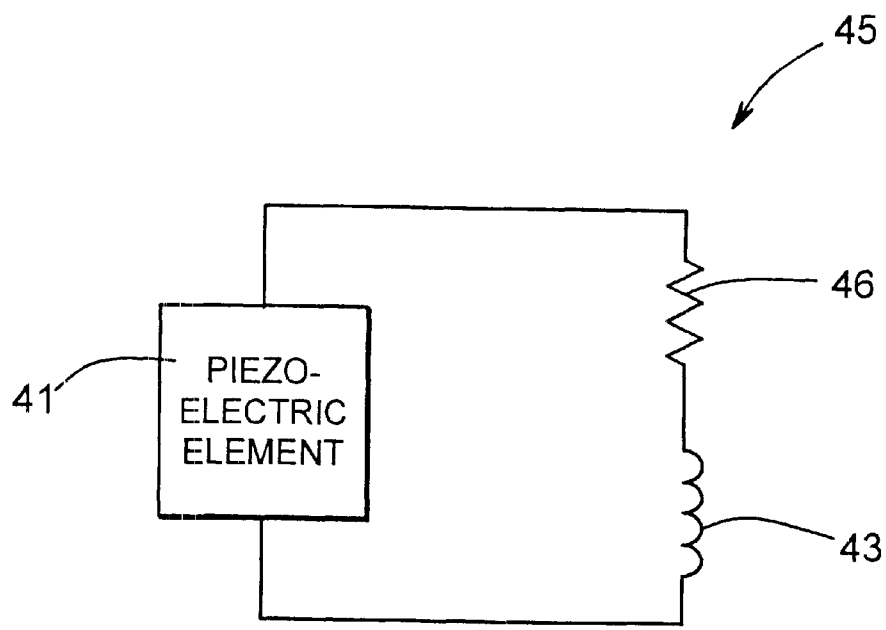
FIG. 5 is a schematic view of a second embodiment of the piezo-based device illustrated in FIG. 1.

FIG. 5 illustrates a second embodiment of the piezo-based device, indicated generally at 45. As shown therein, the piezo-based device 45 includes an element 41 formed from a piezo-electric material, a resistor 46, and an inductor 43 that are connected in a series electrical circuit. Thus, the piezo-based device 45 is essentially an RLC electrical circuit. The piezo-based device 45 functions in essentially the same manner as the piezo-based devices 30, 37 described above to passively dampen the vibrations that are generated in the center bearing assembly 22. The addition of the inductor 43 causes more electrical current to pass through the resistor 46, thus providing a higher measure of damping than the piezo-based devices 30, 37 described above, but over a narrower damping frequency range. The magnitudes of the desired resistance for the resistor 46 and inductance for the inductor 43 can be calculated using the following relationships:

$$L = \{C\omega^2[1+(\lambda k^2)/(1-k^2)]^{1/2}\}^{-1}$$

and $$R = \{(2)^{1/2}[(\lambda k^2)/(1-k^2)]^{1/2}\}/\{C\omega[1+(\lambda k^2)/(1-k^2)]\}$$

where R is equal to the resistance, C is equal to the capacitance, k is equal to the transverse coupling constant, $\lambda$ is equal to the strain energy capture, and w is equal to frequency of the vibrations to be dampened. The piezo-based device 45 may be preferred for use in touring vehicles, for example, where the target mode of vibration is a higher-order bending mode. The frequency of this bending mode tends to not vary as greatly as a function of the actual boundary conditions because the road surface is relatively uniform. Thus, the piezo-based device 45 provides increased passive damping at a single center damping frequency.

Figure 6:
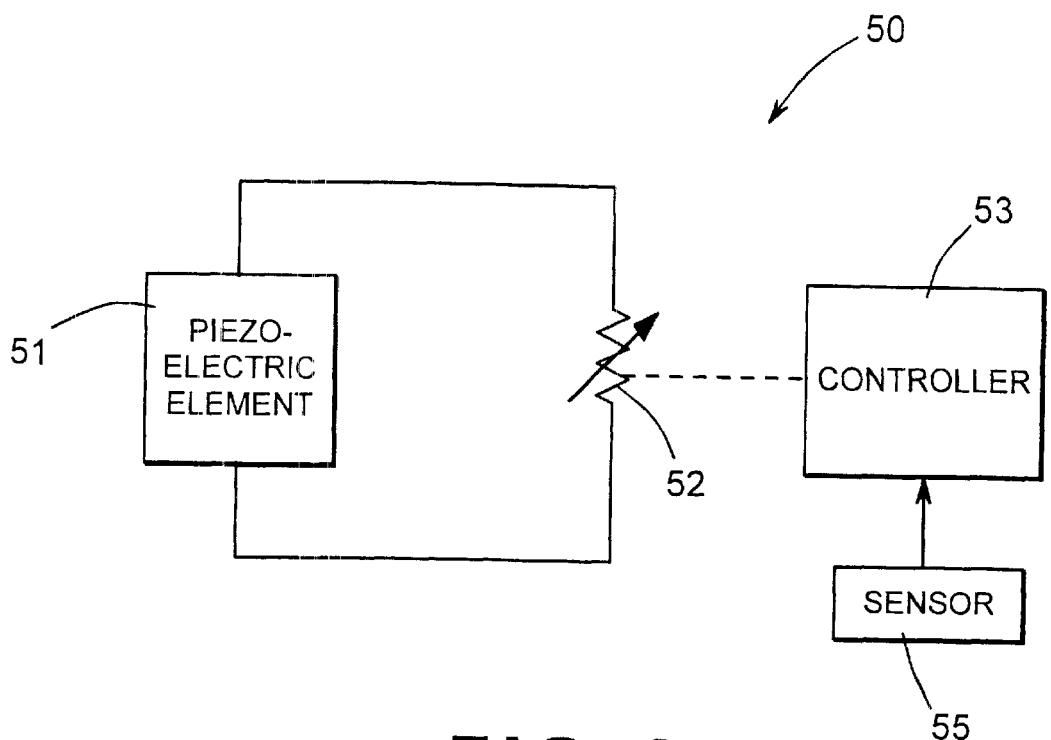
FIG. 6 is a schematic view of a third embodiment of the piezo-based device illustrated in FIG. 1.

FIG. 6 illustrates a third embodiment of the piezo-based device, indicated generally at 50. As shown therein, the piezo-based device 50 includes an element 51 formed from a piezo-electric material and a resistor 52 that are connected in a series electrical circuit. Thus, the piezo-based device 50 is essentially an RC electrical circuit. The magnitude of the resistance of the resistor 52 is a variable and is controlled by a controller 53 in response to the magnitude and/or frequency of vibrations sensed by a sensor 55. The controller 53 may be a microprocessor or similar device that is capable of varying the resistance of the resistor 52 in response to the sensed vibrations and may be attached to the center bearing assembly 22 or mounted elsewhere on the vehicle. The sensor 55 may be embodied as one or more known sensing devices and can be mounted directly on the rubber support member 38 to generate electrical signals to the controller 53 that are representative of the magnitude and/or frequency of the vibrations. The piezo-based device 50 functions in essentially the same manner as the piezo-based devices 30, 37 described above to passively dampen vibrations, but can be tuned during operation of the vehicle 10 in accordance with prevailing conditions. The variable resistor 52, the controller 53, and the sensor 55 may be incorporated into the RLC circuit illustrated in FIG. 5 if desired.

Figure 7:
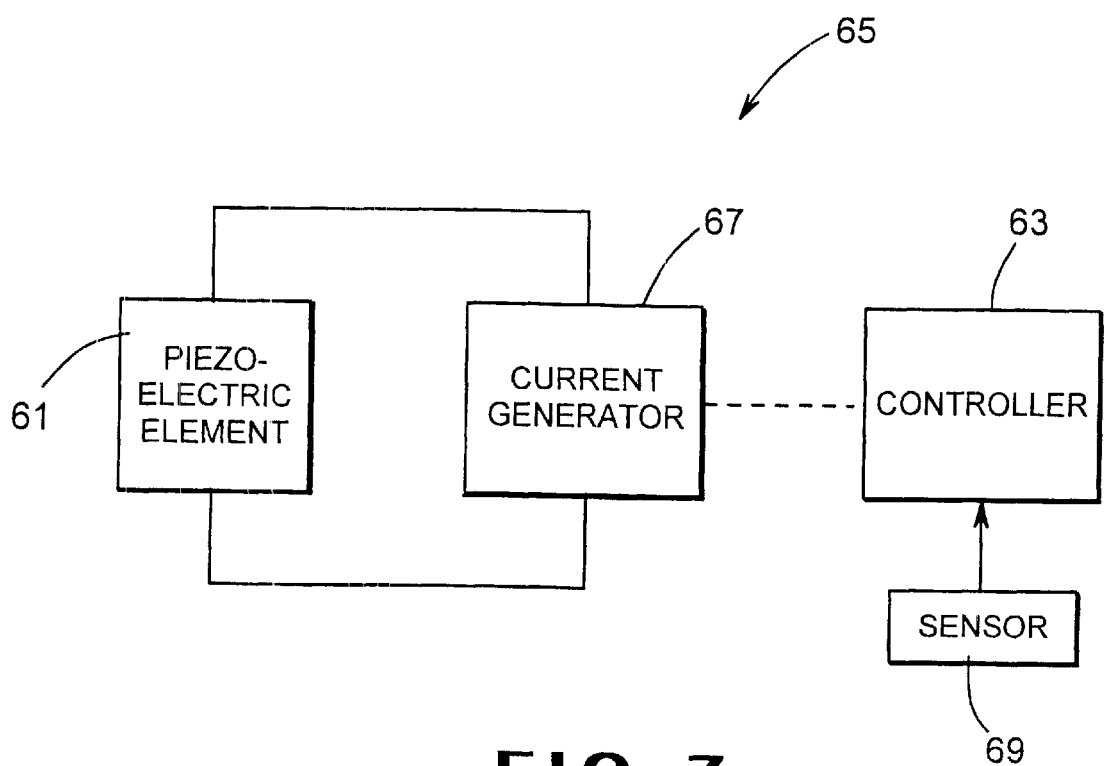
FIG. 7 is a schematic view of a fourth embodiment of the piezo-based device illustrated in FIG. 1.

FIG. 7 illustrates a fourth embodiment of the piezo-based device, indicated generally at 65. As shown therein, the piezo-based device 65 includes an element 61 formed from a piezo-electric material and a current generator 67 that are connected in a series electrical circuit. The current generator 67 is conventional in the art and is controlled by a controller 63 in response to the magnitude and/or frequency of vibrations sensed by a sensor 69. The controller 63 may be a microprocessor or similar device that is capable of varying the amount of electrical current that is supplied to the element 61 in response to the sensed vibrations and may be attached to the center bearing assembly 22. The stiffness of the element 61 is controlled in accordance with the magnitude of the electrical current supplied thereto by the current generator 67. The sensor 69 may be embodied as one or more known sensing devices and can be mounted directly on the center bearing assembly 22 to generate electrical signals to the controller 63 that are representative of the magnitude and/or frequency of the vibrations. The piezo-based device 65 functions to actively dampen the vibrations that are generated in the center bearing assembly 22.

It is to be understood that, because each of the piezo-based devices 30, 37 provides damping over a single range of vibration frequencies determined by the center damping frequency, each of the various piezo-based devices 30, 37 can be tuned to different center damping frequencies to permit damping to occur over multiple ranges of vibration frequencies. It is also contemplated that a passive piezo-based device can be used to generate power to operate active piezo-based devices.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A bearing assembly adapted to rotatably support a rotatable shaft relative to a support surface comprising:
   a bearing adapted to rotatably support a rotatable shaft;
   a bracket adapted to be secured to a support surface;
   a support member supporting said bearing within said bracket; and
   a piezo-based device secured to said support member for damping vibrations generated therein.

2. The bearing assembly defined in claim 1 wherein said piezo-based device is connected in an electrical circuit to a resistive element and an inductive element.

3. The bearing assembly defined in claim 1 wherein said piezo-based device is connected in an electrical circuit to a variable resistive element.

4. The bearing assembly defined in claim 3 further including a controller for varying the resistance of said resistive element.

5. The bearing assembly defined in claim 4 further including a sensor for generating a signal that is representative of the vibrations in said support member, and wherein said controller is responsive to said signal from said sensor for varying the resistance of said resistive element.

6. The bearing assembly defined in claim 1 wherein said piezo-based device is connected in an electrical circuit with a current generator, and further including a controller for controlling the operation of said current generator, and a sensor for generating a signal that is representative of the vibrations in said support member, and wherein said controller is responsive to said signal from said sensor for controlling the operation of said current generator.

7. The center bearing assembly defined in claim 1 wherein said support member has a top surface, and further including a mounting channel for receiving said support member, and said piezo-based device is mounted between said mounting channel and said top surface of said support member.

8. The bearing assembly defined in claim 7 wherein said top surface is provided with an inset area that has a shape and depth suitable for receiving and retaining said piezo-based device.

9. The bearing assembly defined in claim 1 wherein said support member has sides, said bracket has two generally vertical legs, and one or more of said piezo-based devices is mounted between said sides of said support member and said legs of said bracket.

10. The bearing assembly defined in claim 1 wherein said piezo-based device is embedded within said support member.

11. The bearing assembly defined in claim 1 wherein a plurality of said piezo-based devices are secured to said support member for damping vibrations generated therein.

12. The bearing assembly defined in claim 1 wherein at least one of said piezo-based devices extends from said bearing to said bracket.

13. The bearing assembly defined in claim 1 wherein a plurality of said piezo-based devices are spaced circumferentially around said bearing.

14. A vehicle drive train assembly comprising:

a transmission;

an axle; and a plurality of driveshaft components connected between said transmission and said axle, said plurality of driveshaft components including a center bearing assembly for supporting a rotatable shaft and a piezo-based device secured to said center bearing assembly for damping vibrations generated in said center bearing assembly.

15. The vehicle drive train assembly defined in claim 14 wherein said center bearing assembly includes a bearing adapted to rotatably support the rotatable shaft, a bracket adapted to be secured to a vehicle frame, and a support member supporting said bearing within said bracket, said support member having a top surface, and said center bearing assembly having a mounting channel for receiving said support member, and wherein said piezo-based device is mounted between said mounting channel and said top surface of said support member.

16. The vehicle drive train assembly defined in claim 15 wherein said top surface is provided with an inset area that having a shape and depth suitable for receiving and retaining said piezo-based device.

17. The center bearing assembly defined in claim 15 wherein at least one of said piezo-based devices extends from said bearing to said bracket.

18. The center bearing assembly defined in claim 15 wherein a plurality of said piezo-based devices are spaced circumferentially around said bearing.

19. The vehicle drive train assembly defined in claim 15 wherein said support member has sides, said bracket has two generally vertical legs, and one or more of said piezo-based devices is mounted between said sides of said support member and said legs of said bracket.

20. The center bearing assembly defined in claim 14 wherein a plurality of said piezo-based devices are secured to said center bearing assembly for damping vibrations generated in said center bearing assembly.

* * * * *